April 17, 1973 P. J. WOODING 3,728,100
ELECTRIC FURNACE, PARTICULARLY OF THE TYPE USING A
DRY CRUCIBLE TO MELT HIGHLY REACTIVE
METALS, AND METHOD
Filed Sept. 3, 1969 2 Sheets-Sheet 1
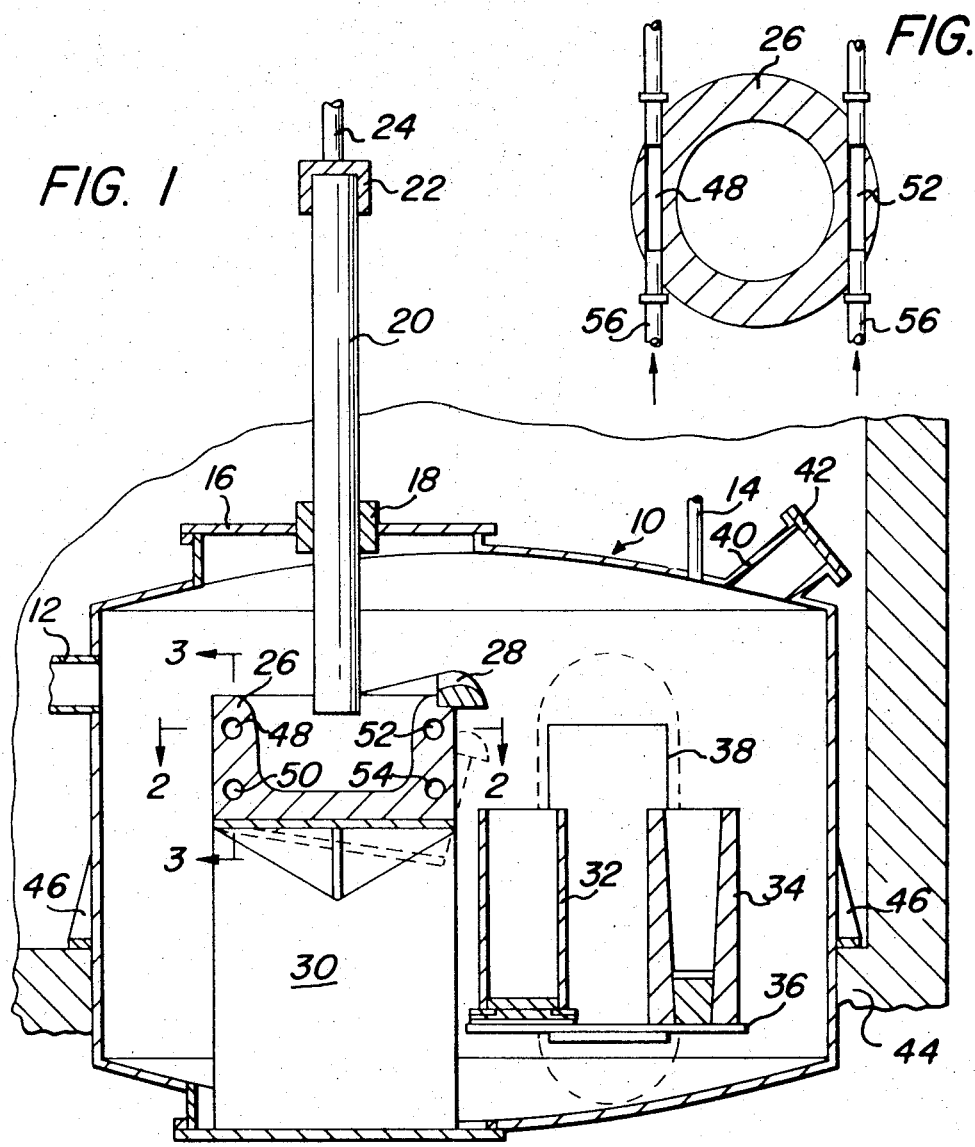
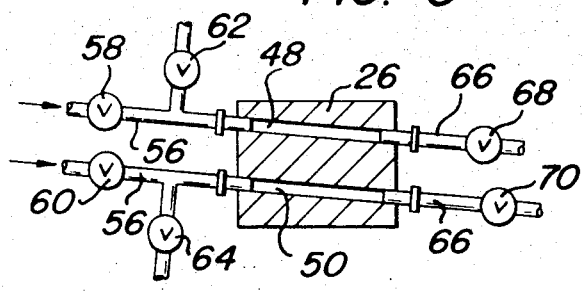
INVENTOR
PATRICK J. WOODING April 17, 1973 P. J. WOODING 3,728,100
ELECTRIC FURNACE, PARTICULARLY OF THE TYPE USING A
DRY CRUCIBLE TO MELT HIGHLY REACTIVE
METALS, AND METHOD
Filed Sept. 3, 1969 2 Sheets-Sheet 2
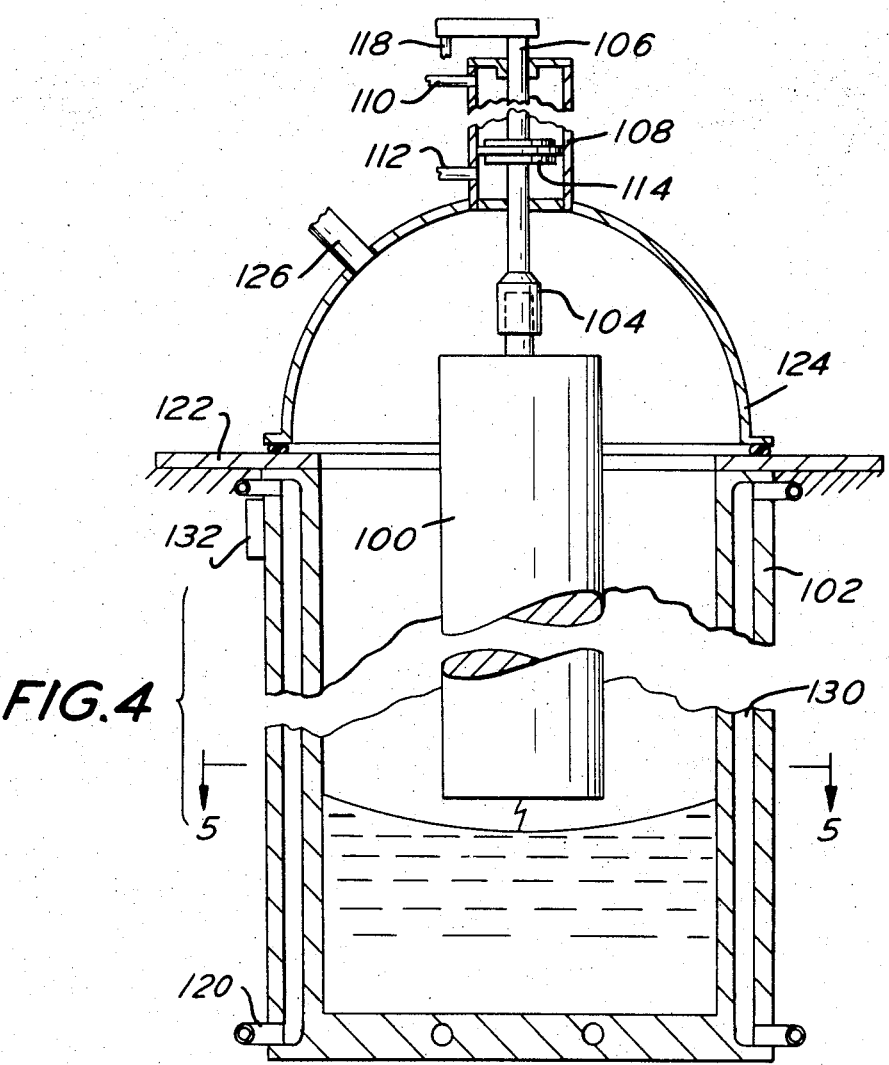
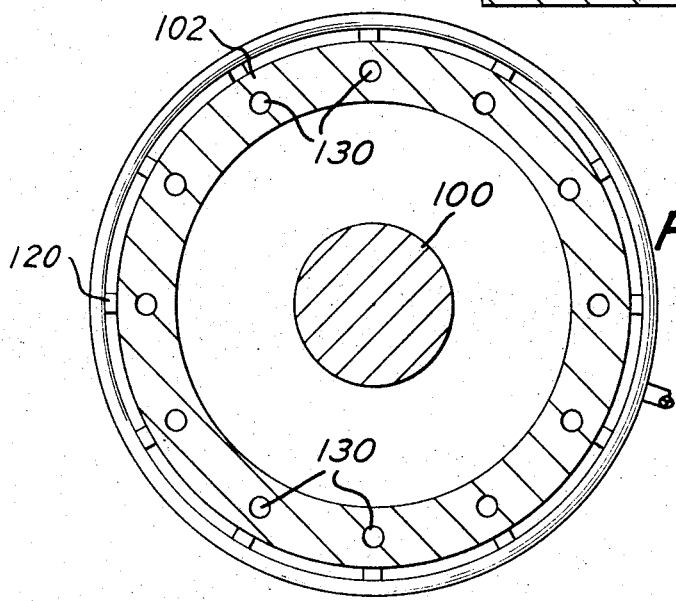
INVENTOR
PATRICK J. WOODING
BY
Seidel & Gonda
ATTORNEYS.

United States Patent Office 3,728,100
Patented Apr. 17, 1973

3,728,100
ELECTRIC FURNACE, PARTICULARLY OF THE TYPE USING A DRY CRUCIBLE TO MELT HIGHLY REACTIVE METALS, AND METHOD
Patrick J. Wooding, Moorestown, N.J., assignor to Consarc Corporation, Rancocas, N.J.
Continuation-in-part of application Ser. No. 776,476, Nov. 18, 1968. This application Sept. 3, 1969, Ser. No. 855,001
Int. Cl. C21c 5/52; C22d 7/04; H05b 7/18
U.S. Cl. 75—10        31 Claims

ABSTRACT OF THE DISCLOSURE

In the preferred embodiment the number of melts per unit time is increased for an electric furnace which uses a crucible to absorb the excess heat load by providing:

(1) Means to rapidly cool the crucible after the power has been removed, or (2) Small, isolated quantities of water which reduce the explosion hazard.

The cooling means takes the form of passages which extend through the crucible and are connected to a source of water. Water is permitted to enter the passages only after the power has been removed or in small quantities only. When using the dry skull technique, the crucible will have been substantially emptied of molten metal. Means are provided to pass inert gas through the passages to clear residual water.

DISCLOSURE

This is a continuation-in-part of patent application Ser. No. 776,476 filed Nov. 18, 1968 now abandoned.

This invention relates to an improved electric melting furnace. More particularly, this invention relates to an electric furnace of the type using a crucible to melt highly reactive metal and a method for operating such furnace.

The present invention has particular use in those types of furnaces which melt relatively reactive metals such as titanium, uranium and other similar meltable materials which have high melting points and a chemical affinity for atmospheric gases, such as oxygen, when heated in the neighborhood of their melting point.

There are several known methods and furnaces for melting titanium. See for example U.S. Pat. 3,273,212 which discloses the so-called skull melting technique using a consumable electrode. One of the primary advantages of a consumable electrode furnace is that it is capable of producing the high temperatures required for fusing reactive metals such as titanium under vacuum or in an inert atmosphere, so as to prevent the combination of the molten metal with oxygen, without crucible contamination because the melting takes place in a shell of the metal itself. This shell is often called a "skull."

There is a large amount of heat produced during any metal melting operation, regardless of whether it is titanium or any other reactive metal. The crucible naturally heats by conduction from the molten metal and radiation from the arc or conduction from the slag in an electroslag process. When melting steel or some other relatively non-reactive metal, the solution to the problem is straightforward. The crucible is provided with large capacity cooling means which may take the form of cooling jackets through which water or some other coolant is continuously passed. Therefore, the size of the crucible can be increased simply by increasing the capacity of its cooling means. However, this solution to the crucible cooling problem is dangerous when working with titanium or other highly reactive metals.

Water cannot be safely used without providing safety devices such as protective barriers, to cool a crucible designed to contain titanium or other highly reactive metals because of the explosion risks involved. If by chance the arc should pierce a crucible that is water cooled, two explosions occur. The first is a steam explosion that normally ruptures the vacuum chamber. Then the molten metal reacts with the water producing metal oxide and free hydrogen. Air is pulled into the ruptured vacuum chamber by the still operating vacuum equipment as well as the vacuum created by condensing steam. The hydrogen and air then combine explosively. In the past such explosive recombinations have been known to completely destroy furnaces and kill or maim workmen.

One solution to the dangerous explosion problem is to use a coolant other than water. Eutectics such as liquid soduim and potassium theoretically are an excellent coolant. However, NAK coolant is extremely difficult to work with in that it too is reactive. Therefore, very expensive handling equipment is required. Indeed, the cost of installing liquid metal cooling may exceed the cost of the remaining portions of the furnace. Moreover, the use of liquid metal coolant is in effect trading one hazard for another. The hazards inherent in working with liquid sodium and potassium are less than those encountered with water as a coolant, but they still exist in one form or another.

There presently exists a moderately successful solution to the explosion problem. The solution is based upon the use of a dry crucible; that is, a crucible to which no external cooling means is applied, at least during the time when the electric power is applied to the furnace. This is called "dry skull melting."

The principal danger in melting highly reactive metals is the simultaneous existence of electrical energy (particularly in the form of an arc), molten metal, water within the furnace structure, and a frangible crucible. It is true that the primary explosion results when the cooling water comes in contact with the molten metal but it is also true that the primary initiating factor is the piercing of the crucible wall by an electric arc. For a variety of reasons which are not always possible to control, the arc between the electrode and molten metal may form between the electrode and the crucible wall. Unless the arc is quickly extinguished it will pierce the wall and permit water to enter the crucible. On the other hand, the presence of both water and molten metal within the crucible structure is not nearly so dangerous as when electrical energy, water and molten metal are present. In other words, it is an acceptable risk to permit water and molten metal to be simultaneously present in a crucible for a short period of time since the instances where the crucible wall fractures because of wear or age are rare.

The dry crucible principle eliminates the water by using a crucible whose thermal conductivity and specific heat is such that it can absorb the heat generated during the melting of an electrode or charge of metal; that is, the crucible is made of a good heat conductive material whose mass is so large that it is capable of absorbing the excess heat. Stated otherwise, the crucible acts as a large heat sink.

Dry crucibles are almost always made of copper having a mass such that temperature of the crucible itself is raised to about 600° to 700° F. during each melt. This temperature is chosen as being low enough to prevent the copper from annealing and therefore avoids damage to the crucible. On the other hand, it permits the mass of the crucible to be kept at a minimum within workable limits.

The foregoing solution is excellent for making occasional melts such as are used in experimental work. Its major disadvantage is that it takes hours for the crucible to cool down before it can be used again for another melt. The result is that the furnace cannot be used for repetitive production on a commercially economical scale. Another disadvantage is that only a relatively small amount of metal can be melted before the crucible must be cooled. However, the manufacture of small melts is wholly acceptable if the number of melts per unit time can be increased. The present invention increases the number of melts per unit time.

In accordance with the present invention, the furnace is provided with a dry crucible having sufficient mass to absorb the heat load generated during a melt, but instead of making it solid, one or more conduits are bored through the crucible in sufficient quantity, size and position so they are capable of carrying water to rapidly cool the crucible. The conduits are connected through appropriate piping to a source of water. However, no water is passed through the crucible during the application of electrical power. Thus, the melting operation is the same as for the above described dry crucible principle. Then after having completed a melt, the power is removed (and the crucible emptied to the extent possible when doing skull melting), valves are opened and water forced through the crucible walls. The use of water at this time is permissible since the principal hazard is gone. The water is forced through the crucible at a high rate where most of it is converted to steam. Since the heat energy for converting the water comes from the crucible, it must cool. Cooling of the crucible is very rapid because the rate of heat transfer from the crucible to the water is rather high. After the crucible has been cooled to the required temperature, gas can be forced in behind the water so that what remains of the water or steam is forced out of the crucible. The result is that in a matter of minutes the crucible has been cooled by water and returned to a dry crucible condition at a relatively low temperature. The furnace is now ready to melt more metal.

The foregoing is an improvement in the dry crucible or skull melting technique. However, it is still limited by the necessarily small capacity of the skull-like crucible and it has no applicability to the manufacture of ingots.

Accordingly, the preferred embodiment of the present invention is concerned with a relatively hazard-free method and apparatus for manufacturing ingots of titanium, zirconium, uranium, and other relatively reactive metals in commercially acceptable sizes and at commercially acceptable rates.

In accordance with the present invention, the crucible is designed so as to form ingots as in a conventional consumable electrode furnace. However, instead of using water cooled jackets to form the crucible, a crucible is formed by a relatively thick wall of copper or other heat conducting metal through which a plurality of water conducting conduits extend. The crucible can be operated in a manner described above for the skull furnace but in the preferred embodiment, cooling water is continuously passed through the crucible. Moreover, electrical energy is continuously applied during the melt so that the ingot is formed substantially in the manner of any conventional consumable electrode furnace. The explosive danger is eliminated by one of two processes. In the first process, relatively small amounts of cooling water are periodically introduced into the crucible walls. This, of course, introduces an explosive hazard. However, proper metering of the water through the conduits can substantially eliminate the explosive hazard. If an arc should burn through the crucible wall, it will burn through to only one of the conduits. If the amount of water in that conduit is kept small enough, then the resultant explosion is too small to damage the furnace.

As a second alternative, the water can be continuously fed through the conduits or pulsed through the conduits whenever required.

For the purpose of illustrating the invention, there is shown in the drawings forms which are presently preferred; it being understood, however, that this invention is not limited to the precise arrangements and instrumentalities shown.

FIG. 1 is a transverse sectional view of a typical dry crucible skull furance which may be used in accordance with the present invention.

FIG. 2 is a sectional view taken through the crucible in FIG. 1 along the line 2—2.

FIG. 3 is a sectional view taken along the crucible in FIG. 1 along the line 3—3.

FIG. 4 is a sectional view of a furnace for manufacturing ingots.

FIG. 5 is a transverse sectional view of the furnace illustrated in FIG. 4 taken along the line 5—5.

Referring now to the drawing in detail, wherein like numerals indicate like elements, there is shown in FIG. 1 a consumable electrode furnace for melting highly reactive metals, such as titanium, in accordance with the present invention.

The furnace comprises a vacuum chamber 10 which has a generally cylindrical shape. However, those skilled in the art will readily recognize that the shape of the vacuum chamber may be varied or modified in accordance with the requirements of the particular furnace installation. The vacuum chamber 10 is provided with an outlet 12 which is connected to vacuum equipment (not shown). The vacuum equipment is of sufficient capacity that the interior of the vacuum chamber 10 can be reduced to and maintained at a required pressure level. A conduit 14 provides communication from the interior of chamber 10 to a source of inert gas. If desired, the interior of the chamber 10 can be filled with inert gas which would replace the atmospheric gases that have been exhausted through the outlet 12. Appropriate valving is provided in the conduit 14 so that the inert gas may be selectively added to the chamber 10. Such other means (not shown) as are desired may be provided for removing all of the oxygen from the chamber 10, it being understood that any highly reactive metal such as titanium must be melted in the absence of oxygen.

A cover plate 16 supports an appropriate seal 18 through which a consumable electrode 20 of the material to be melted passes. The upper end of the electrode 20 is held by a clamp 22 which is attached to the lower end of a ram 24 or any other conventional means for raising and lowering the electrode 20. It should be understood that the seal 18, electrode clamp 22 and ram 24 are shown diagrammatically in the drawing. The actual physical structural details of these items are well known to those skilled in the art and need not be described in detail. By way of example, but not of limitation, reference is made to United States Patents Nos. 3,202,751 and 3,293,347 which disclose a ram and electrode stub clamp, respectively, which may be used in connection with the present invention.

The lower end of the electrode 20 is positioned above the crucible 26 so that it may project downwardly and into it. As shown, the crucible 26 is relatively shallow in that its inside diameter is greater than its inside depth. The walls of the crucible are made of a highly heat conductive metal which is capable of containing the metal to be melted into it. In the preferred embodiment the crucible is made of copper or a copper alloy. The crucible 26 is provided on its upper periphery with a pouring spout 28.

The crucible 26 rests on an appropriate supporting stand 30 provided with a suitable mechanism for tilting the crucible (not shown) so as to empty the same into the molds 32 and 34.

A turntable 36 is provided within the chamber 10 in general alignment with the spout 28. The turntable 36 supports the molds 32 and 34 so that they may be moved into position below the spout 28 to receive molten metal emptied from the crucible 26.

The chamber 10 is provided with an access door 38 adjacent the turntable 36. Another access door (not shown) my be provided in the wall of chamber 10 opposite door 38. The access door 38 provides the means for removal of the molds 32 and 34 after the molten metal has been poured therein.

An opening 40 closed by a glass plate 42 is provided in the top wall of chamber 10. The opening 40 is positioned so that the interior of chamber 10 may be observed.

The entire chamber 10 is mounted on the supporting structure 44 by appropriate flanges 46 or the like.

The electrode stub clamp 22 is connected through the ram 24 to a source of electrical energy (not shown) which preferably is capable of supplying large amounts of direct current. In a like manner, the crucible 26 is connected to the same source of electrical energy.

Referring now to FIGS. 2 and 3, there is shown cross-sectional views of the crucible 26. The figures illustrate that the crucible has relatively thick walls which provide the required mass of heat conductive material for absorbing the excess heat during the melting operation. In this respect, the design of the crucible 26 is conventional and entirely in accordance with the so-called dry melt principles. It should be noted that the dry melt principle may be referred to as "dry skull" melting. In accordance with the present invention, the crucible is provided with a plurality of conduits 48, 50, 52 and 54 which pass through the walls of the crucible. The conduits 48, 50, 52 and 54 are preferably designed to be strong enough to be equivalent to boiler trade specifications; that is, the conduits 48, 50, 52 and 54 are designed so that they are capable of withstanding the forces created by high pressure steam which is developed at an extremely high rate. Because of the size of the crucible walls, the provision of bores to the specification is not difficult to achieve.

As illustrated in FIG. 3, each of the conduits 48, 50, 52 and 54 passes through the crucible 26 preferably at an angle with respect to the horizontal. The reason for boring the conduits at an angle is to assist in the removal of residual water by providing a means whereby it may flow out of the crucible under the force of gravity. Other means for removing water from the conduits 48, 50, 52 and 54 is described below.

Each of the conduits 48, 50, 52 and 54 is connected to a source of water by appropriate piping 56. The piping 56 is shown diagrammatically. Those skilled in the art will realize that it must pass through the walls of the chamber 10 and appropriate sealing means must be provided. Moreover, the piping 56 must be of such specification that it is capable of carrying water under pressure and withstanding the back pressure from the steam as it is formed in conduits 48, 50, 52 and 54.

The flow of water from the source (not shown) is controlled by the valves 58 and 60 in conduits 48 and 50 and similar valves in conduits 52 and 54. If desired, the source may provide cold water taken directly from any conventional system or, preferably, the source provides water which has been superheated. The valves 58 and 60 or their equivalent for conduits 52 and 54 may be remotely operated valves that are controlled from a central location.

The piping 56 also connects each of the conduits 48, 50, 52 and 54 to a source (not shown) of inert gas such as argon or the like. The flow of gas into the piping 56 is controlled by the valves 62 and 64 which are normally closed and prevent the entrance of gas except when required. The purpose of the inert gas is to force any residual water or steam out of the conduits 48, 50, 52 and 54 after the cooling operation is complete. The valves 62 and 64 as well as their equivalent for the conduits 52 and 54 may be remotely operated valves which are controlled from a central location.

Each of the conduits 48, 50, 52 and 54 is preferably connected at its exit end to appropriate piping 66 which connects the aforesaid conduits to appropriate condensers (not shown) for converting the steam into water. If desired, the condensed steam may be returned into the system or simply emptied as waste. The inert gas is allowed to escape to atmosphere. Valves 68 and 70 are provided in the piping 66 for sealing the conduits 48, 50, 52 and 54 during the melt operation. The valves 68 and 70, and their equivalent for the conduits 52 and 54, may be remotely operated valves connected for operation at a central location.

The foregoing described electric furnace is operated in the following manner:

The crucible 26 is mounted in its upright position as shown. Molds 32 and 35 are placed within the vacuum chamber 10. A consumable electrode 20 of metal to be melted is lowered by the ram 24 into position within the confines of crucible 26. Thereafter the chamber 10 is exhausted of all atmospheric gases, particularly oxygen, through the outlet 12. If desired, the vacuum equipment connected to the outlet 12 may be used to maintain the vacuum chamber 10 at a low pressure. On the other hand, the outlet 12 may be closed and inert gas inserted into the chamber 10 through the conduit 14. The inert gas, which may be argon, replaces the oxygen in the furnace.

Thereafter, consumable electrode 20 and crucible 26 are connected to a source of direct current and an arc is struck. As is conventional, the metal in the electrode 20 is fused off and flows into the crucible 26 which rapidly fills with molten metal. This condition continues until the crucible has been filled. During this operation, the electrode 20 is positioned by adjusting the ram 24.

Once the crucible 26 has been filled, the electrical energy is removed and the electrode 20 withdrawn a sufficient distance to permit the crucible to be tilted. Thereafter, the crucible 26 is tilted so as to pour the molten metal into the mold 32. Any remaining molten metal adheres to the crucible walls and almost immediately assumes a solid or semi-solid condition.

Thereafter, the crucible 26 is returned to its upright position. At this point, the crucible is ready to begin another melting operation with the exception that it must be cooled so as to be ready to absorb the heat developed during the next melting operation. In the past the cooling of the crucible has been achieved by simply delaying the next melt until sufficient heat has been conducted, convected and radiated off to lower its temperature. In a typical operation, the crucible must be cooled from 600 to 700° F. down to approximately 250° F. This may take as much as three to four hours or more if the crucible is permitted to cool naturally.

Once the crucible has been emptied, the valves in the piping 56 for each of the conduits 48, 50, 52 and 54 are opened and water is forced under pressure into each of the conduits. As the water enters the conduits, it is converted to steam and blows out through the piping 66. The valves 68 and 70, if built into the system, are opened simultaneously with the valves 58 and 60. The steam generated may be collected or condensed or blown out, whichever is desired. The latent heat of vaporization of water is 970 B.t.u./pound. Thus, each pound of water converted into steam is going to cause the crucible to give up 970 B.t.u. Obviously, the crucible can be rapidly cooled in this manner, particularly because the rate of heat transfer between the copper and water is very high. The water is continuously forced through the conduits 48, 50, 52 and 54 until the crucible has cooled to approximately 250° F.

Immediately after the crucible has been cooled to 250°, the water is cut off from the piping 56 by closing valves 58 and 60 and their equivalents. Simultaneously with the closing of valves 58 and 60, the valves 62 and 64 are opened and high pressure inert gas forced in behind the water so that all that remains of the superheated water vapor and steam is forced out of the crucible. The clearing of the crucible is very rapid. It is necessary to clear all water from the crucible so as to remove the water hazard.

It is estimated that the cooling time for a typical crucible should be approximately fifteen minutes. On the basis of a typical three hour cooling period using natural cooling, this means a substantial increase in the rate at which the furnace can be used.

If desired, the consumable electrode can be made of such a length that a large number of melts can be made before it is entirely consumed.

Although the present furnace has been described in terms of a consumable electrode 20, those skilled in the art will readily recognize that a non-consumable electrode can be substituted. In this instance, a charge of scrap metal will be inserted in the crucible and melted as it lies there. The furnace which uses non-consumable electrodes would of course have to have a means for charging the crucible after each melt. Such means are readily available in the art.

Referring now to FIG. 4, there is shown a consumable electrode furnace of the arc type for manufacturing ingots which has been modified in accordance with the present invention. The electrode 100 is supported within the crucible 102 by an electrode stub clamp 104 which is fixed to the end of the ram 106. It should be understood that the furnace illustrated in FIG. 4 is shown diagrammatically and with only sufficient detail to illustrate the invention.

The ram 106 is within a cylinder 108 into which hydraulic fluid is introduced through the ports 110 and 112. The hydraulic fluid applies pressure to the piston 114 which is fixed to the ram 106. The ram 106 carries current to the electrode 100 and is connected to a source of direct current by the conductor 118. The crucible 120 is also connected to a source of direct current. As is conventional, the ram 106 and cylinder 108 adjust the position of the electrode 100 during the melting operation.

The crucible 102 is preferably made of copper and is supported at floor level by the flange 122. The crucible 102 is vacuum sealed by the head 124. The head 124 is connected to a vacuum pump by the conduit 126. If desired, the crucible could be mounted in a vacuum chamber.

As thus far described, the furnace shown in FIG. 4 is a known vacuum arc furnace with one major distinction. The crucible 102 is a solid mass of copper. A conventional crucible would have an inner and outer wall so as to provide a cooling jacket.

In accordance with the present invention, the mass and thermal conductivity properties of the crucible wall 102 are such that it is capable of absorbing the heat generated during the time a portion of the electrode 100 is melted. The crucible walls 102 are also provided with a plurality of passages 130 which are connected to a source of water and inert gas in the manner described and shown in FIG. 3. In other words, passages 130 provide means whereby water may be introduced into the crucible during a melt or after a melt has been completed. Temperature sensing means 132 are mounted on the crucible wall so as to determine when the crucible 102 has reached its maximum allowable temperature during any particular melt and when it has been cooled.

The furnace illustrated in FIG. 4 is operated in the following manner:

A consumable electrode 100 is lowered by the ram 106 into position within the confines of the crucible 102. Thereafter, the head 124 is sealed and the crucible exhausted of all atmospheric gases through the conduit 126. If desired, an inert gas, such as argon, may be inserted into the crucible.

Thereafter, consumable electrode 100 is connected to a source of direct current through the conductor 118 as is the crucible through the conductor 120. Then an arc is struck. The metal in the electrode 100 begins to fuse off and flows into the crucible 102. This process continues until the temperature sensor 132 indicates that the temperature of the crucible has reached its maximum allowable limit (between 600 and 700° F. for copper).

Once the temperature has been reached, remotely controlled valves are opened and water is forced under pressure into each of the passages 130. As the water enters the passages 130, it is converted into steam and blows out through the opposite side. The water rapidly cools the crucible in the manner described with respect to the foregoing skull furnace, i.e. 970 B.t.u. per pound of water. The crucible 102 is reduced to a temperature of approximately 102 is reduced to a temperature of approximately 250° F. or some other desired temperature and then the water is turned off.

Thereafter, high pressure inert gas is forced in behind the water so that all that remains of the superheated water vapor steam is forced out of the crucible passage 130. Electrode 100 continues to melt until such time as the temperature sensor 132 again indicates that the crucible walls have been heated to the critical temperature. Then the crucible is again cooled in the manner described above. This process is repeated until the electrode 100 has been consumed.

It should be noted that the method of operating the furnace illustrated in FIG. 4 differs primarily from the skull process in that no metal is removed from the crucible and energy is continuously applied. The danger of explosion, however, is reduced or entirely eliminated for two reasons. The first is that water is not always present in the crucible walls. The second reason is that even if an arc should pierce the wall, only the amount of water in that particular conduit will enter the crucible. By adjusting the flow of water through each conduit, and the size of each conduit, it is possible, depending on the size of the melt, to keep the amount of water so small that the resultant steam generation will not burst the crucible walls or otherwise damage the furnace. Some consumable electrode furnaces have electronic equipment which immediately detects the jumping of the arc to the crucible wall. Hence, the arc is quickly extinguished. The same equipment that extinguishes the arc can also be used to terminate the flow of water through the conduit 130.

The foregoing described method substantially reduces the explosive hazard even though molten metal, electrical energy, water and a frangible crucible may be simultaneously present. In another form of the invention, the hazard can be even further reduced by removing the arc each time water is pulsed through the conduits 130. Thus, only molten metal, water and the frangible crucible are present. The removal of the arc during the cooling process, however, constitutes a removal of the primary factor in initiating a dangerous explosion. The simultaneous existence of water and molten metal in the crucible is a danger, but this is an acceptable risk during the short time that the water is present. Moreover, the amount of water present in each conduit is relatively small.

The foregoing processes for operating the furnace illustrated in FIG. 4 were described for an arc melt. It should be understood that an electroslag process may be substituted. In this instance, no vacuum or inert gas would be required since the slag serves to protect the molten metal from the atmosphere. Otherwise, the operation of the furnace is substantially the same as described above.

An unexpected advantage of the furnace of FIG. 4 is its ability to produce better ingots in certain instances. The finished ingot in a conventionally cooled furnace has a continum of temperatures ranging from relatively cold at its bottom to melting temperatures at its top. Some metals are prone to cracking when subjected to such a temperature differential. Such cracking can, of course, completely ruin the finished ingot. This phenomenon can place a severe limitation on the rate at which these metals can be melted and on the maximum size of ingot that can be produced. These limitations can be improved or eliminated in the present furnace because the temperature differential in the ingot is greatly reduced. In other words, the bottom of the ingot is kept at a much higher temperature because of the relatively high crucible temperature.

The cooling methods described herein may be generically referred to as "pulsed cooling" in the claims.

The present invention may be embodied in other specific forms without departing from the spirit or essentiial attributes thereof.

It is claimed is:

1. A method of operating an electric furnace to melt metal in a crucible, comprising the steps of heating the metal by the application of electrical energy to melt the metal substantially in the absence of free oxygen and substantially in the absence of a coolant, periodically cooling said crucible by first removing the electrical energy and then passing water through said crucible so as to maintain the temperature of the crucible below a predetermined temperature, then removing the water, and then again applying electrical energy to melt the metal.

2. A method of operating a furnace to melt metal in a dry crucible, comprising the steps of using electrical energy to melt the metal substantially in the absence of a coolant and substantially in the absence of free oxygen within a crucible made of a heat conductive material and having a plurality of passages extending between the walls thereof, permitting the crucible to absorb the heat transferred to it during the melt in the absence of a coolant, said crucible having sufficient mass and heat conductive properties to absorb said heat transferred to it, cooling said crucible by periodically passing water through said crucibles and converting said water to steam, and then removing the water and steam from said passages.

3. A method of operating an electric furnace to melt metal, comprising the steps of heating the metal substantially in the absence of free oxygen and in the absence of a coolant within a crucible made of a heat conductive material, said crucible having sufficient mass and heat conductive properties to absorb the heat transferred to it during a melt in the absence of a coolant, then cooling the crucible, the cooling of said crucible including passing coolant through said crucible only after electric power has been removed.

4. A method of operating a furnace to melt metal in accordance with claim 3 wherein all coolant used to cool the crucible is cleared from the crucible prior to using it to again accept molten metal.

5. A method of operating an electric furnace to melt metal, comprising the steps of heating the metal to the melting point substantially in the absence of free oxygen and in the absence of a coolant within a crucible made of a heat conductive material, said crucible having sufficient mass and heat conductive properties to absorb the heat transferred to it during a melt in the absence of a coolant, pouring molten metal from said crucible into a mold after said metal has been melted so as to substantially empty said crucible, then cooling said crucible, the cooling of said crucible including passing water through said crucible only after the electric power has been removed.

6. A method of operating a furnace to melt metal in accordance with claim 5 wherein the cooling of said crucible includes passing water through pre-formed passages within the crucible structure.

7. A method of operating a furnace to melt metal in accordance with claim 5 wherein all water used to cool the crucible is cleared from the crucible prior to using it to again accept molten metal.

8. A method of operating a furnace in accordance with claim 5 wherein said metal is melted by an electric arc process.

9. A method of repeatedly operating a furnace to melt metal at an increased repetition rate within a dry crucible, comprising the steps of heating the metal to the melting point substantially in the absence of free oxygen and substantially in the absence of a coolant within a crucible made of a heat conductive material, such crucible having sufficient mass and heat conductive properties to absorb the heat transferred to it during a melt in the absence of a coolant, pouring the molten metal from said crucible into a mold after said metal has been melted, then cooling said crucible, the cooling of said crucible including passing water through said crucible only after the metal has been poured from said crucible, and then once again melting the metal in said crucible.

10. A method of operating a furnace to melt metal in accordance with claim 9 wherein the cooling of said crucible includes passing water through pre-formed passages within the crucible structure.

11. A method of repeatedly operating a furnace to melt metal in accordance with claim 9 wherein all of the water used to cool in the crucible is cleared from the crucible prior to again using it to accept molten metal.

12. A method of repeatedly operating a furnace to melt metal in accordance with claim 9 wherein metal is melted into the furnace by supplying electric current to the unmelted metal in the form of a consumable electrode made of the unmelted metal.

13. A method of repeatedly operating a furnace to melt metal in accordance with claim 9 wherein all water used to cool the crucible is cleared from the crucible prior to again using the crucible to accept metal by forcing said water from said crucible with an inert gas.

14. A method of operating a furnace to melt metal at an increased rate within a dry crucible, comprising the steps of heating the metal to the melting point substantially in the absence of free oxygen and substantially in the absence of a coolant within a crucible made of a heat conductive material, said crucible having sufficient mass and heat conductive properties to absorb the heat transferred to it during the melt in the absence of a coolant, removing the electric power for melting the metal, and then cooling said crucible, the cooling of said crucible including passing water through said crucible only after electric power has been removed, and then once again melting metal into said crucible over the previously melted metal.

15. A method of operating a furnace to melt metal in accordance with claim 14 wherein the cooling of said crucible includes passing water through pre-formed passages within the crucible structure.

16. A method of operating a furnace to melt metal in accordance with claim 14 wherein the water used to cool the crucible is cleared from the crucible prior to again using it to accept molten metal.

17. A method of operating a furnace to melt metal in accordance with claim 14 wherein all water used to cool the crucible is cleared from the crucible prior to using the crucible to accept metal by forcing said water from said crucible with an inert gas.

18. A method of operating a furnace to melt metal in accordance with claim 14 wherein the metal is melted by an electric arc process.

19. A method of operating a furnace to melt metal in accordance with claim 14 wherein the metal is melted by an electro-slag process.

20. In an electric furnace for melting metal comprising a chamber, means for exhausting oxygen from said chamber, a crucible for containing molten metal, said crucible being within said chamber, said crucible being made of a heat conductive material and having sufficient mass and heat conductive properties to absorb heat transferred to it during the melt in the absence of a water coolant, means to melt metal into the crucible, means to pour molten metal in said crucible into a mold, and means to cool said crucible, said means including open passages in said crucible, conduit means connecting said passages to a source of water, valving means for permitting water to enter said crucible passages only when the crucible has been emptied of molten metal, and means to clear said passages of water after said crucible has been cooled, said passages passing through said crucible at an angle with respect to the horizontal whereby clearing of said passages of water may be assisted by the action of gravity.

21. In an electric furnace in accordance with claim 14 wherein said means to clear said passages of water after said crucible has been cooled includes means to force an inert gas through said passages.

22. In an electric furnace in accordance with claim 20 wherein said means to melt metal into the crucible includes supplying electric current to a consumable electrode means.

23. In an electric furnace in accordance with claim 20 wherein the means to melt metal into the crucible includes non-consumable electrode means for passing electric current through the metal.

24. In an electric furnace for melting metal comprising a crucible for containing molten metal, means for exhausting oxygen from said crucible, said crucible being made of a heat conductive material and having sufficient mass and heat conductive properties to absorb the heat transferred to it in the absence of water coolant, electrode consumable means to melt metal into the crucible, and means to cool said crucible, said means to cool said crucible including open passages in said crucible walls, conduit means connecting said passages to a source of water, valving means for permitting water to enter the crucible passages only when the crucible has been heated to a predetermined temperature, and means to clear said passages of water after said crucible has been cooled to a predetermined temperature.

25. In an electric furnace in accordance with claim 24 wherein said means to clear said passages of water after said crucible has been cooled includes means to force a gas through said passages.

26. A method of operating an electric furnace to melt reactive metal in a crucible, comprising the steps of heating the metal by the application of electrical energy substantially in the absence of free oxygen and substantially in the absence of coolant, cooling said crucible by periodically passing a coolant which may be hazardous in the presence of the molten reactive metal through said crucible so as to maintain the temperature of the crucible below a predetermined temperature, removing the coolant, said coolant being passed through said crucible while electrical energy is being applied to melt the metal, and passing said coolant through said crucible in a manner so as not to create an explosive hazard.

27. The method of operating an electric furnace in accordance with claim 26 wherein water is used as a coolant, and metering the amount of water in the crucible to maintain the quantity thereof below the amount which would create an explosive hazard.

28. A method of operating an electric furnace to melt reactive metal in a crucible in accordance with claim 26 wherein the maner of passing said coolant through said crucible includes metering the amount of coolant to maintain the quantity thereof below the amount which would create an explosive hazard.

29. A method of operating a furnace to melt metal in accordance with claim 26 wherein the cooling of said crucible includes passing water through pre-formed passages within the crucible structure.

30. A method in accordance with claim 26 wherein said metal is melted by an electroslag process.

31. A method in accordance with claim 26 wherein said metal is melted by an electric arc process.

References Cited

UNITED STATES PATENTS

| | | | | |
|---|---|---|---|---|
| 3,067,473 | 12/1962 | Hopkins | | 75—10 R |
| 3,152,372 | 10/1964 | Hopkins | | 75—10 R |
| 3,214,153 | 10/1965 | Hauff | | 13—9 |
| 3,273,212 | 9/1966 | Garmy | | 164—52 |

CHARLES N. LOVELL, Primary Examiner

P. D. ROSENBERG, Assistant Examiner

U.S. Cl. X.R.

13—9; 75—11